Nov. 9, 1926.  1,606,603

F. E. ST. CLAIR

EXTRACTING MACHINE

Filed April 28, 1926    2 Sheets-Sheet 1

Frank E. St. Clair
INVENTOR

BY Victor J. Evans
ATTORNEY

WITNESS:

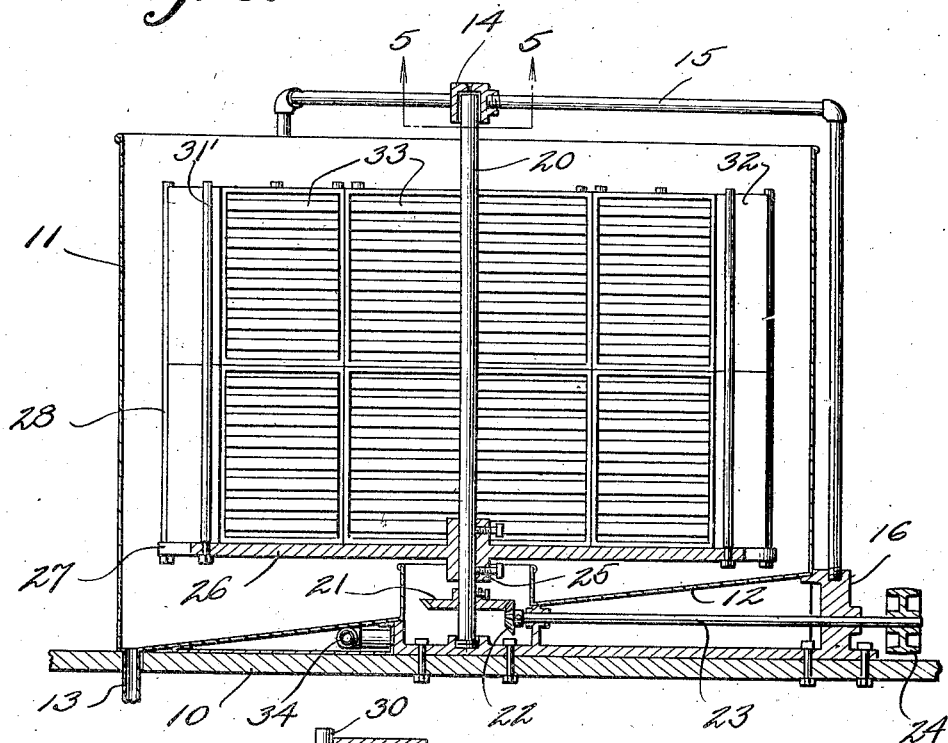
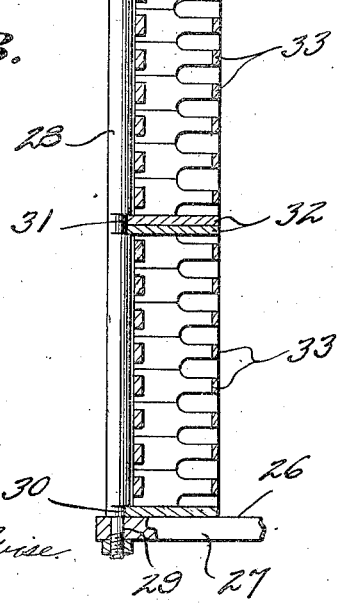
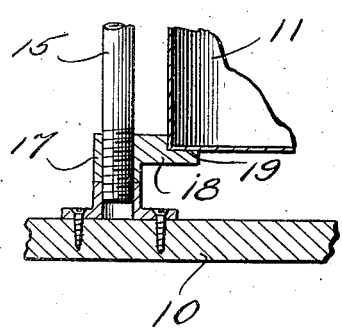

Patented Nov. 9, 1926.

1,606,603

UNITED STATES PATENT OFFICE.

FRANK E. ST. CLAIR, OF WORLAND, WYOMING.

EXTRACTING MACHINE.

Application filed April 28, 1926. Serial No. 105,322.

This invention relates to extracting machines for use upon and in conjunction with frames adapted to be arranged horizontally and in superimposed relationship within the machine which, when rotated will exercise centrifugal force to the frames in order that the honey within the formations of combs therein will be forced outwardly and yet overcome the usual necessity of reversing the frames to extract the honey from both sides thereof.

The primary object being the support of frames within and upon the machine in order that centrifugal side thrust may be exercised upon the combs in order that the latter may not break, but permit the discharge of the honey between the spaces defined between the side walls of the superimposed frames.

An additional and further object of the invention consists in a sloping false bottom for the receptacle of the machine within which is injected a quantity of water adapted to be heated by a steam pipe extending and positioned between the receptacle bottoms whereby the usual effects of granulation are overcome.

With the above and other objects in view, the invention further includes the following novel features and details of construction, to be hereinafter more fully described, illustrated in the accompanying drawings and pointed out in the appended claims.

In the drawings:—

Figure 2 is a transverse section taken on line 2—2 of Figure 1.

Figure 3 is a fragmentary elevation of the superimposed relationship of the supers upon the machine.

Figure 4 is a detail view taken on line 4—4 of Figure 1.

Figure 1:
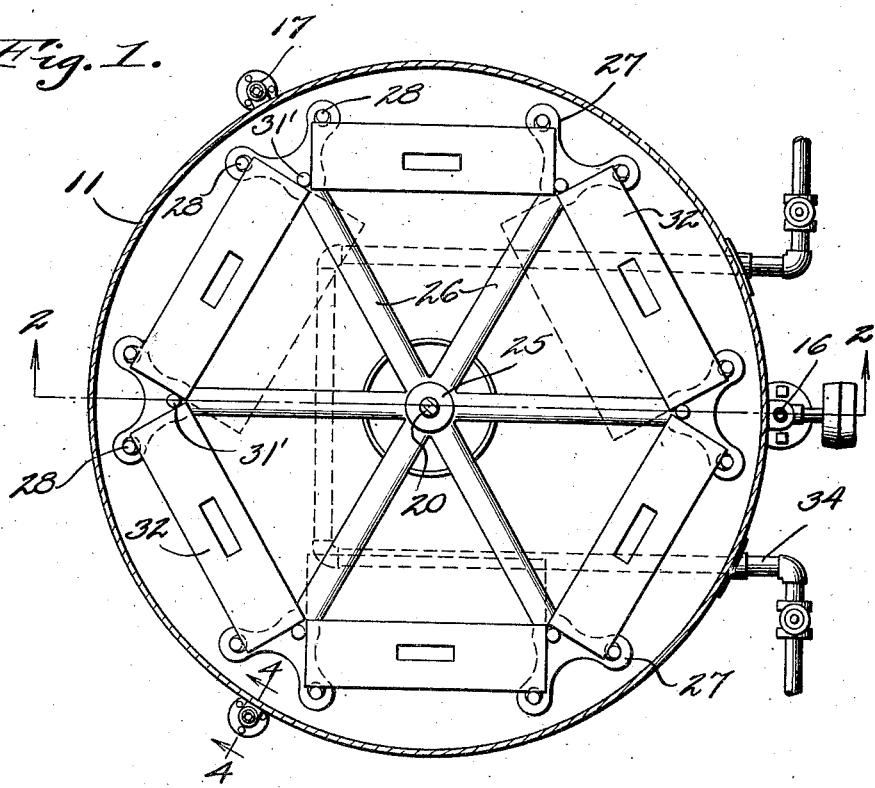
Figure 1 is a top plan view of the invention.
Figure 6:
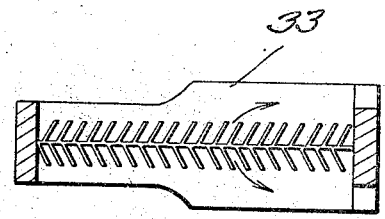
Figure 6 is a transverse section taken through a super and illustrating the formation of combs therein and the partition wall between the cellular combs.
Figure 5:
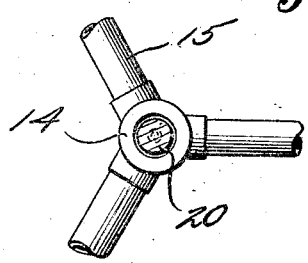
Figure 5 is a sectional view taken on line 5—5 of Figure 2.

Referring to the drawings in detail, wherein like characters of reference denote corresponding parts, the reference character 10 indicates a platform upon which a receptacle 11 is supported and which includes an inclined bottom 12 sloping toward a common discharge pipe 13 in the manner as illustrated in Figure 2 of the drawings.

Radiating from a bearing 14 are supporting irons 15 having their end portions extending downwardly in spaced relation upon the outer sides of the receptacle 11 and secured within appropriate portions of an inclined spacing member 16; a sleeve member 17 forming the fixture for the end portion of one of the supporting arms 15 and which includes an outwardly extending projection 18 upon one side thereof and defining an annular seat 19 upon its upper side upon which is supported the bottom and adjacent side wall of the receptacle 11 whereby the inclination thereof may be assured to drain off the honey in a manner to be presently described.

A vertically disposed shaft 20 has its upper end journalled within the socket bearing 14 while its opposite end is journalled upon an appropriate portion of an inclined spacing member 16 and includes a ring gear 21 fixed at an appropriate point in the length thereof and meshing with a pinion 22 carried upon the inner end of the shaft 23 journalled within the side wall of the inclined spacing member 16, and providing a pulley wheel 24 upon its opposite end over which may be trained a belt connected with a suitable source of energy.

A hub member 25 fixed to the vertically disposed shaft 20 has outwardly extending and radially disposed arms 26 extending therefrom which in turn provide outwardly and obliquely disposed circular end portions 27. Rods 28 having reduced lower end portions 29 are adapted for insertion within the circular enlarged portions 27 of the arms 26 in the manner as illustrated in Figure 3 of the drawings and which include upon their inner sides cut-out portions 30 adjacent their ends and relatively enlarged cut-out portions 31 at intermediate portions in their lengths, all of which being formed upon the inner sides thereof. Rod members 31' extend upwardly in spaced relation from the arms 26 at the junctures of the outwardly and obliquely disposed circular enlarged end portions 27, the purpose of which will be readily apparent.

Supers 32 having a multiplicity of horizontally disposed frames 33 arranged therein, have their respective side edges received within the cut-out portions 30 and 31 of the rods 28, while their meeting ends abut the opposite sides of the rods 31' to sustain such supers 32 in the positions as indicated in Figure 1 of the drawings.

The invention comprising the subject matter of the above entitled invention in contradistinction to prior devices now in use, is to provide and define a water compartment between the upper side of the inclined spacing member 16 and the under side of the inclined bottom 12 of the receptacle 11 through which may extend a steam pipe 34 for heating such water in order that the proper degree of temperature at approximately 165° may so affect the honey discharged, in order to overcome granulation such honey will be caused to run after which the machine is set in motion in order that the centrifugal force imparted thereby will cause such honey to be thrust outwardly and between the side walls of the frames 33 and subsequently drain upon the inclined bottom 12 of the receptacle 11 and through the common discharge pipe 13.

The peculiarity of honey combs in providing a partition wall between comb formations upon the opposite sides thereof permits the frames 33 to be arranged in super-imposed and horizontally disposed relationship, whereby such honey combs will be caused to deflect upon themselves owing to the rotary force imparted thereto which will greatly aid in the extracting of the honey.

As noted from the full and dotted lines in Figure 1 of the drawings, full depth hives may be extracted in place of half depth supers.

It is thought that the invention provides an extracting device which will become highly appreciated by those experienced in bee culture and which, owing to the construction and mounting of the supers therein obviates the usual necessity of reversing the frames to extract the honey from the comb formed upon the opposite sides of the partition within each of the frames.

The invention is susceptible of various changes in its form, proportions and minor details of construction, and the right is herein reserved to make such changes as properly fall within the scope of the appended claims.

Having thus described my invention what I claim is:—

1. An extracting device comprising a platform mounting, a stationary receptacle arranged upon the upper side of the platform, a vertically disposed shaft journalled upon the upper side of the platform within the receptacle, a hub fixed to the shaft, a multiplicity of radially disposed arms extending outwardly from the hub and terminating at their opposite ends in outwardly and obliquely disposed circular end portions, vertically disposed rods extending within the enlarged circular end portions of the arms, a plurality of supers supported upon the upper sides of the arms and abutting the inner sides of the rods, horizontally disposed frames positioned within the supers, and means connected with the vertically disposed shaft for imparting a rotary movement to the supporting arm whereby the centrifugal force and effect imparted thereby will cause the honey to flow from the frames and collect within the receptacle.

2. An extracting device of the character described comprising a platform having the inclined bottom of a receptacle supported thereon, a vertically disposed shaft journalled upon the upper side of the platform within the receptacle, a hub member fixed to the vertically disposed shaft, outwardly extending radially disposed arms upon the hub member providing outwardly and obliquely disposed circular enlarged portions, a multiplicity of vertically disposed rods providing cut-out portions upon the respective inner sides thereof, supers arranged upon the upper sides of the arms and having their respective outer side edges arranged within the cut-out portions provided in the inner sides of the rods, horizontally disposed frames positioned in superimposed relation within the supers, heating means arranged beneath the inclined bottom of the receptacle to prevent the granulating effect of the honey, and operating means connected with the vertically disposed shaft to impart the necessary rotary movement to the arms by means of which the centrifugal force afforded thereby will thrust the honey outwardly against the inner side walls of the receptacle to drain upon the lower inclined bottom thereof.

3. An extracting machine comprising a receptacle having an inclined bottom seated upon the upper side of a platform, a vertically disposed operating shaft extending through the bottom of the receptacle and journalled upon the upper side of the platform, a collar fixed upon the shaft, radially disposed arms extending from the collar and terminating in obliquely disposed enlarged circular end portions, rods provided upon the upper sides of the enlarged circular portions and at their junctures with the arms, a plurality of supers having their lower edges seated upon the upper sides of the circular enlarged portions of the arms and engaging the inner sides of the rods to be sustained against displacement during rotary movement and centrifugal force, and a plurality of horizontally disposed super-imposed rows of frames positioned within the supers adapted to throw off the honey formed within the combs between the adjacent side walls thereof whereby such combs may not be caused to bend and break due to side thrust in the process of extracting.

4. An extracting machine comprising a receptacle having an inclined bottom seated upon the upper side of a platform, a vertically disposed operating shaft extending through the bottom of the receptacle and journalled to the upper side of the platform, a collar fixed to the shaft and having radially disposed arms extending therefrom, said arms terminating in obliquely disposed enlarged circular end portions, rods provided upon the upper sides of the enlarged circular portions and at their junctures with the arms, a plurality of supers having their lower edges seated upon the upper sides of the circular enlarged portions of the arms and engaging the inner sides of the rods to sustain the same against displacement during a rotary movement and centrifugal force, a plurality of horizontally disposed super-imposed rows of frames positioned within the supers adapted to throw off the honey formed within the combs within the frames between the adjacent side walls thereof whereby such combs may not be caused to bend and break due to side thrust in the process of extracting, a water compartment defined between the platform and the inclined bottom of the receptacle, a steam pipe extending within such compartment for heating the water whereby the usual tendency of granulation is obviated.

In testimony whereof I affix my signature.

FRANK E. ST. CLAIR.